Aug. 28, 1945.  D. B. McNEELY  2,383,871
THUMB CONTROLLED COPING SAW
Filed June 6, 1944

INVENTOR.
David B. McNeely
BY
Victor J. Evans & Co.
ATTORNEYS

Patented Aug. 28, 1945

2,383,871

UNITED STATES PATENT OFFICE 2,383,871

THUMB-CONTROLLED COPING SAW

David B. McNeely, Calvert, Tex.

Application June 6, 1944, Serial No. 538,909

2 Claims. (Cl. 145—33)

The invention relates to a hand saw, and more especially to an adjustable saw blade mounting for coping saws or the like.

The primary object of the invention is the provision of a mounting of this character, wherein a saw blade can be readily and easily adjusted in its supporting frame of a hand saw, particularly a coping saw, the attaching jaws for the saw blade being rotatably mounted in the frame of the saw and operated in unison for the turning of the said blade to vary the angular disposition thereof in the frame.

Another object of the invention is the provision of a mounting of this character, wherein the adjustment of the blade is had by turning a knurled thumb wheel next to the handle side of the frame for such blade, the wheel being in thumb reach when the frame is held in the hand of a user of the saw.

A further object of the invention is the provision of a mounting of this character, wherein a worm gear differential is arranged to adjust the saw blade when held within the frame of the saw, the mounting and adjuncts thereof being novel in construction, and unique in kind.

A still further object of the invention is the provision of a mounting of this character, which is simple in construction, thoroughly reliable and efficient in operation, strong, durable, readily and easily manipulated for the purposes intended thereof, and inexpensive to manufacture and install.

With these and other objects in view, the invention consists in the features of construction, combination and arrangement of parts as will be hereinafter more fully described, illustrated in the accompanying drawing, which discloses the preferred embodiment of the invention, and pointed out in the claims hereunto appended.

In the accompanying drawing.

Similar reference characters indicate corresponding parts throughout the several views in the drawing.

Figure 1:
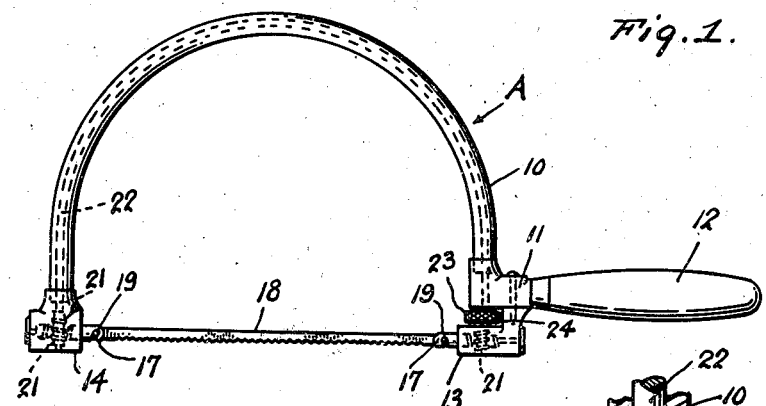
Figure 1 is a side elevation of a coping saw showing the saw blade mounting constructed in accordance with the invention applied thereto.

Referring to the drawing in detail, A designates generally a coping saw having the usual C-shaped or arched saw blade supporting frame 10, in this instance it being tubular throughout the extent thereof. At one end of the frame 10 is fixed a handle bracket 11 carrying a handle 12, which may be fitted thereto in any suitable manner. This bracket 11 at one end has joined therewith a mounting 13, and at the other end of the frame is a mounting 14, both of these mountings being in the form of housings for rotatably accommodating the worm-screw shanks or arbors 15 and 16, respectively, of saw blade attaching jaws or hangers 17.

Figure 2:
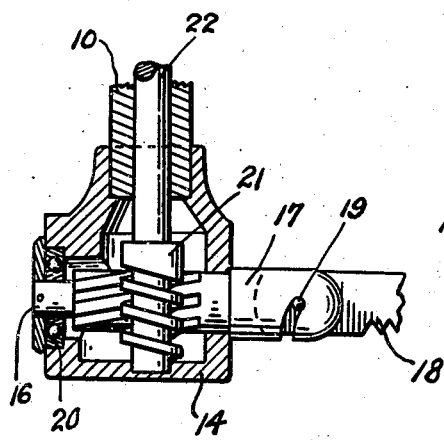
Figure 2 is a fragmentary vertical sectional view through one end of the saw frame.
Figure 3:
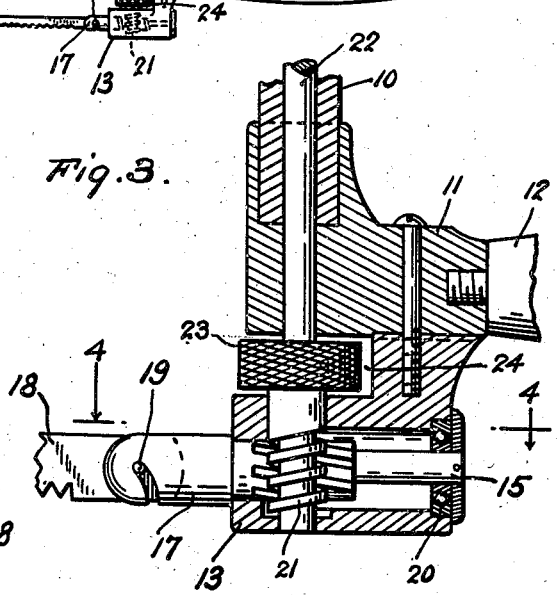
Figure 3 is view similar to Figure 2 through the other end of the saw frame.
Figure 4:
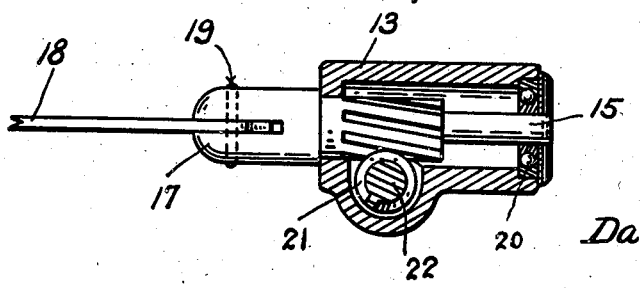
Figure 4 is a sectional view taken on the line 4—4 of Figure 3 looking in the direction of the arrows.

The saw blade 18 at opposite ends thereof is detachably coupled at 19 in these jaws or hangers 17, the shanks 15 and 16 thereof being equipped with ball-bearing fittings 20 in the housing mountings 13 and 14, as is clearly shown in Figures 2 and 3, of the drawing, so that the shanks can be readily and easily rotated for changing the angular disposition of the blade 18 in the frame 10.

Meshing with the shanks or arbors 15 and 16 are worm gears 21, which are suitably fixed to the ends of a flexible shaft 22 trained through the frame 10, the gears being journaled in the mountings 13 and 14 where required to maintain the meshing engagement of the screw shanks or arbors therewith.

The gears 21 are reversely threaded with respect to each other and likewise the shanks or arbors companions thereto; and that gear 21 next to the handle bracket 11 is provided with a knurled thumb wheel 23 which is exposed through a clearance 24 in the mounting 13 for thumb manipulation so that when such wheel is actuated the jaws or hangers 17 will be tuned in unison through the medium of the shaft 22, and thereby angularly adjusting the saw blade 18 in the frame 10, as the occasion may require; and this wheel 23 is in thumb reach when the user of the saw A is grasping the handle 12.

The ball bearing fittings 20 function as thrust bearings for the worm differential set up at each end of the frame 10, as will be obvious.

The shanks or arbors 15 and 16 are longitudinally aligned with each other, and the mountings 13 and 14 completely house the same and the cooperating gears.

What is claimed is:

1. A coping saw comprising a frame, mountings at opposite ends of the frame, worm screw shanks rotatably fitting the mountings, saw blade coupling jaws on the shanks, a saw blade detachably engaged by the jaws, and a flexible operating shaft confined in the frame and having worm gears at its respective ends meshing with the screw shanks for actuating the same in unison with each other for angular adjustment of the blade.

2. A coping saw comprising a frame, mountings at opposite ends of the frame, worm screw shanks rotatably fitting the mountings, saw blade coupling jaws on the shanks, a saw blade detachably engaged by the jaws, a flexible operating shaft confined in the frame and having worm gears at its respective ends meshing with the screw shanks for actuating the same in unison with each other for angular adjustment of the blade, manually operated means for turning said shaft and located at one end only of said frame, the said worm gears being confined within the mountings.

DAVID B. McNEELY.